US006412283B1

(12) United States Patent
Sheoran et al.

(10) Patent No.: US 6,412,283 B1
(45) Date of Patent: Jul. 2, 2002

(54) DEEP LOBED DESWIRLING DIFFUSER TAILPIPE

(75) Inventors: Yogendra Sheoran, Scottsdale; Knauer E. Chad, Chandler; Bert A. Diehl, Jr., Mesa; Timothy R. Whittemore, Scottsdale, all of AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/668,451

(22) Filed: Sep. 22, 2000

Related U.S. Application Data

(60) Provisional application No. 60/184,761, filed on Feb. 24, 2000.

(51) Int. Cl.$^7$ ................................................. F02K 1/00
(52) U.S. Cl. ............................................................ 60/770
(58) Field of Search ................. 60/282, 770; 239/265.19

(56) References Cited

U.S. PATENT DOCUMENTS

| | | |
|---|---|---|
| 3,227,240 A | 1/1966 | Lee et al. |
| 3,802,187 A | 4/1974 | Titus |
| 4,066,214 A | 1/1978 | Johnston |
| 4,077,206 A | 3/1978 | Ayyagari |
| 4,149,375 A | 4/1979 | Wynosky et al. |
| 4,302,934 A | 12/1981 | Wynosky et al. |
| 4,401,269 A | 8/1983 | Eiler |
| 4,487,017 A | 12/1984 | Rodgers |
| 4,543,784 A | 10/1985 | Kirker |
| 4,548,034 A | 10/1985 | Maguire |
| 4,566,270 A | 1/1986 | Ballard et al. |
| 5,110,560 A | 5/1992 | Presz, Jr. et al. |
| 5,440,875 A | 8/1995 | Torkelson et al. |
| 5,884,472 A | 3/1999 | Presz, Jr. et al. |
| 6,082,635 A * | 7/2000 | Seiner .................. 239/265.19 |

OTHER PUBLICATIONS

Research Publication GMR–511 "Experimentally Determined Optimum Geometries For Rectilinear Diffusers with Rectangular, Conical of Annular Cross–Section," by Gino Sovran and Edward D. Klomp, Engineering Development Department, Research Laboratories, General Motors Corporation, Warren, Michigan, Nov. 16, 1965.

* cited by examiner

Primary Examiner—Ehud Gartenberg
(74) Attorney, Agent, or Firm—Robert Desmond, Esq.

(57) ABSTRACT

A tailpipe for a gas turbine engine has a cylindrical portion and lobed portion. The lobed portion extends a length X and has a plurality of circumferentially disposed peaks and valleys. Over at least the first 30 percent of length X, the radius of the each valley is greater than the radius of each peak and is greater than 10% of the equivalent diameter $D_E$. Also, the effective flow area at the end of the lobed portion is greater that the effective flow area at its beginning. The cylindrical portion includes a straight portion and a canted portion.

28 Claims, 3 Drawing Sheets

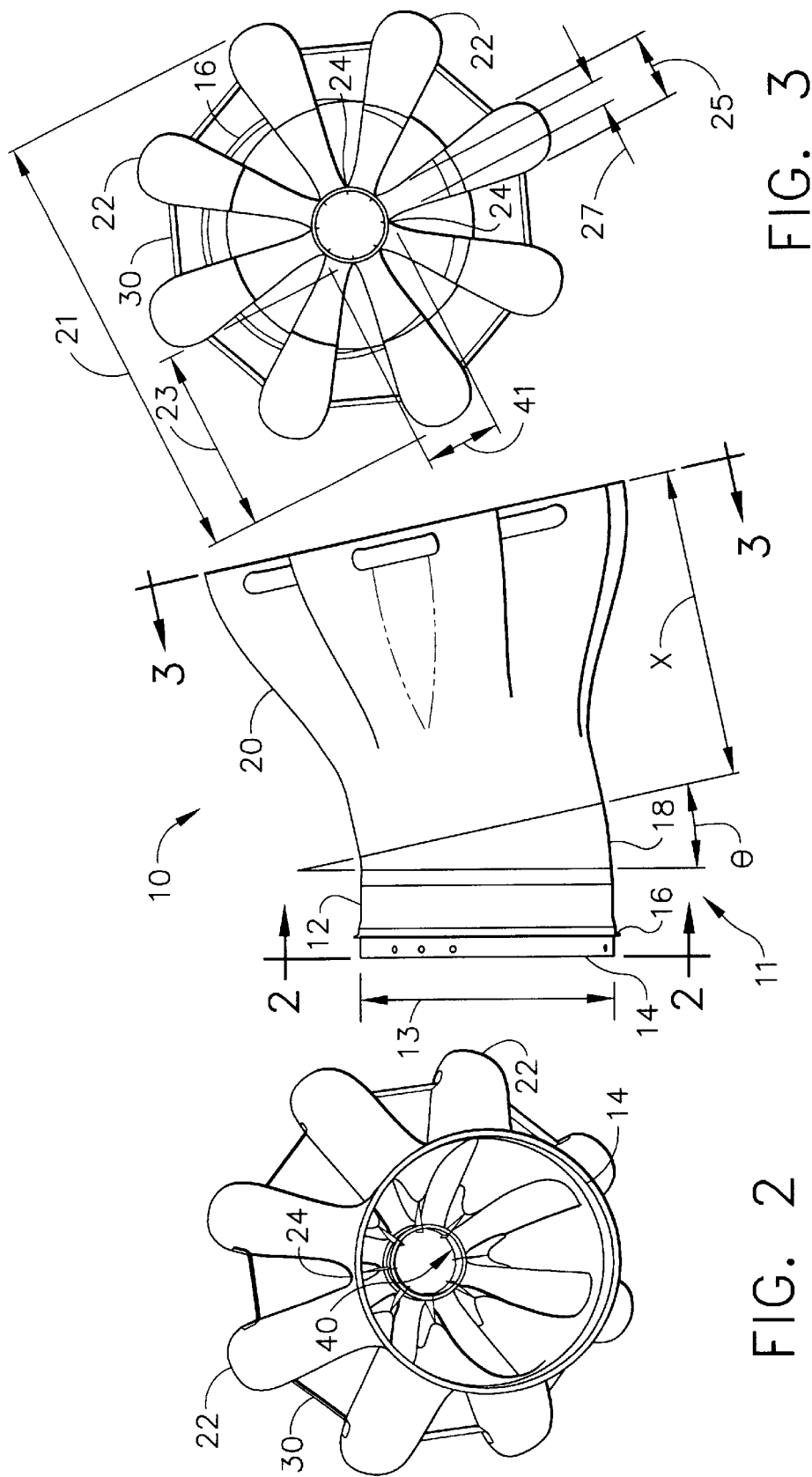

DEEP LOBED DESWIRLING DIFFUSER TAILPIPE

CROSS REFERENCE TO RELATED APPLICATION

Priority is claimed to provisional application serial No. 60/184,761 filed Feb. 24, 2000 which is incorporated by reference herein.

GOVERNMENT RIGHTS

The Government of the United States of America has rights in this invention pursuant to Contract No. DAA1110-99-C-0021 awarded by the U.S. Army.

TECHNICAL FIELD

This invention relates generally to gas turbine engine tailpipes.

BACKGROUND OF THE INVENTION

Most non-thrust producing gas turbine engines, such as those used on helicopters, have attached at the exhaust of the engine a diffusion tailpipe. This tailpipe lowers the back pressure at the last stage turbine and also lowers the exhaust gas velocities to eliminate exhaust plume impingement issues on downstream components.

Typically, these engines also produce exit swirl at off-design power conditions. The traditional method for straightening the exhaust flow, prior to diffusing, is the use of exit guide vanes (EGV). Gas turbine engines are required to traverse a wide range of power settings throughout a standard duty cycle. This large traversal causes the exhaust exit swirl to "swing" from large positive angles to large negative angles where a zero angle is axially straight from the exhaust of the gas turbine engine. Because the swirl angle varies so significantly throughout the operating envelope, a fixed EGV system would be acceptable for only one power setting and introduce a significant increase in system losses at all other settings. Also, a variable EGV system is heavy, costly and increases maintenance requirements.

Accordingly, there is a need for a gas turbine engine tailpipe that effectively eliminates the swirl of the exhaust gas from the engine, diffuses the exhaust gas flow and diminishes its exit velocity for the entire range of swirl angles.

SUMMARY OF THE INVENTION

An object of the present invention is to provide a gas turbine engine tailpipe that effectively eliminates the swirl of the exhaust gas from the engine, diffuses the exhaust gas flow and diminishes its exit velocity for the entire range of swirl angles.

The present invention meets this objective by providing a tailpipe for a gas turbine engine having a cylindrical portion and lobed portion. The lobed portion extends a length X and has a plurality of circumferentially disposed peaks and valleys. Over at least the first 30 percent of length X, the radius of each valley is greater than the radius of each peak and is greater than 10 percent of the equivalent diameter $D_E$. Also, the effective flow area at the end of the lobed portion is greater than the effective flow area at its beginning growing gradually at safe diffusion rates. The cylindrical portion includes a straight portion and a canted portion.

These and other objects, features and advantages of the present invention are specifically set forth in or will become apparent from the following detailed description of a preferred embodiment of the invention when read in conjunction with the accompanying drawings.

BRIEF DESCRIPTION OF THE DRAWINGS

FIG. 1 is a side view of the tailpipe contemplated by the present invention.

FIG. 2 is a front view taken along line 2—2 of the tailpipe of FIG. 1.

FIG. 3 is a rear view taken along line 3—3 of the tailpipe of FIG. 1.

DESCRIPTION OF THE INVENTION

Figure 4:
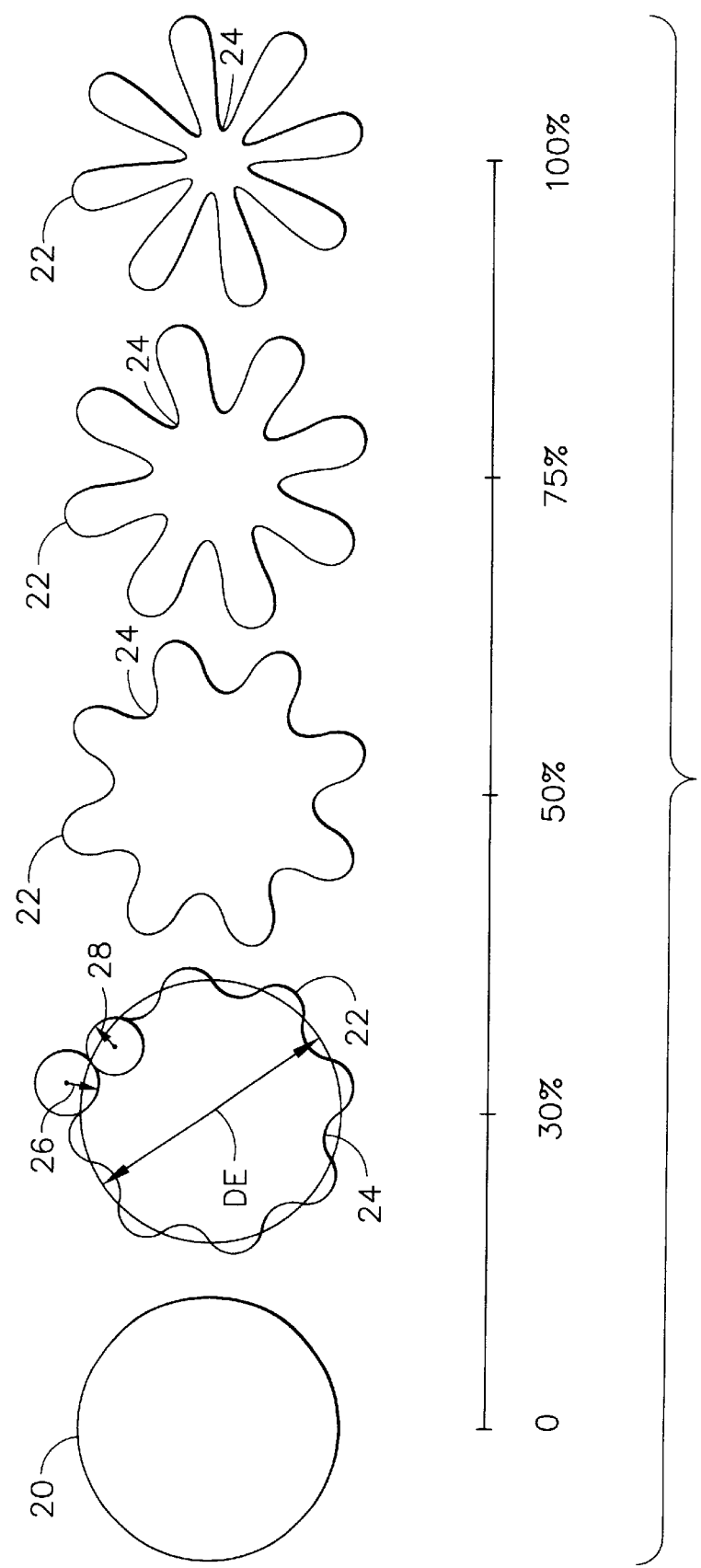
FIG. 4 is an illustration showing how the shape of the lobes change along a length X of FIG. 1.

Referring to FIGS. 1–3, a deep-lobed, deswirling diffuser tailpipe is generally denoted by reference numeral 10. The tailpipe 10 comprises a substantially cylindrical portion 11 comprised of a straight portion 12 and a canted portion 18 having a cant of θ degrees which in the preferred embodiment is 12 degrees. The straight portion 12 has an inlet 14 for receiving a flow of hot gas exhausted by a gas turbine engine. Along its outer surface, the straight portion 12 has a collar 16 that is used to mount the tailpipe 10 to a gas turbine engine. Downstream of the canted portion 18 is a lobed portion 20 that extends a length X. The lobed portion 20 comprises a plurality of circumferentially disposed lobes each having a peak 22 and a valley 24.

Referring to FIGS. 1 and 4, the geometry of the peaks 22 and valleys 24 is a critical aspect of the present invention. FIG. 4 shows how this geometry changes along the length X of the lobed portion 20. At the beginning of the lobed portion 20, (0 percent of X), the geometry is circular and the peaks and valleys have not yet begun to be formed. At a length 30 percent of X, the peaks 22 and valleys 24 are now defined. Along the first 30 percent of the length X, the radius 26 of the valleys 24 should be greater than the radius 28 of the peaks 22. Preferably, the ratio of the valley radius 26 to the peak radius 28 should be about 1.1. This allows the exhaust gas flow from the gas turbine engine which is circumferentially swirling to enter the lobes without separation regardless of the circumferential direction of the swirl. Also, along the first 30 percent of the length X, the radius 26 is greater than 10 percent of the equivalent diameter $D_E$ where the equivalent diameter is the diameter of a circle that is equal in area to the cross-section area enclosed by the lobes at any given location along X. This ensures that the exhaust gas flowing through the tailpipe will be deswirled, that is straightened. In the preferred embodiment, at the 30 percent location radius 26 equals 2.1296 inch, radius 28 equals 1.931 inch and $D_E$ equals 18.578 inch. Thus the ratio of radius 26 to radius 28 in the preferred embodiment is 1.1028 and ratio of radius 26 to $D_E$ is 0.1146 (11.46 percent). Beyond the 30 percent location and as shown in FIG. 4 at the 50 percent, 75 percent and 100 percent locations, the peaks 22 and valleys 24 become sharper. As a result, most of the exhaust gas flows through the lobes and is deswirled. This exhaust gas flow fills about 77 percent of the exit area of the lobed portion 20. In comparison, in a prior art non-lobed diffuser with swirled flow only 54 percent of the exit area provides diffusion. Importantly, the effective flow area at 100 percent of X is at least 1.72 times greater that the effective flow area at 0.0 percent of X and grows gradually at the safe diffusion rates prescribed in "Experimentally Determined Optimum Geometries For Rectilinear Diffusers With Rectangular, Conical Or Annular Cross-Sections" by Gino Sovran and Edward D. Klomp, Research Publication GMR-511 Nov. 16, 1965. This ensures that the exhaust gas is diffused through the lobed portion 20 undergoing a gradual increase in static pressure until it reaches ambient, while incurring only a slight pressure loss. Also, as exhaust gas pressure increases, its flow velocity will effectively go down thus mitigating potential plume impingement issues that may increase the heating of the aircraft skin adjacent the tailpipe.

The maximum width 21 of the lobed portion 20 is labeled in FIG. 3, as is the lobe depth 23. Preferably, the ratio of the lobe depth 23 to the maximum width 21 of the lobed portion 20 is about 0.4. The diameter 13 of the cylindrical portion 11 is labeled in FIG. 2. Preferably, the maximum width 21 of the lobed portion 20 exceeds the diameter 13 of the cylindrical portion 11 by a factor of at least about 1.7.

An inner stiffening ring 40 is shown in FIG. 2 and its diameter 41 is shown in FIG. 3. Preferably, the diameter 41 of the inner stiffening ring 40 is about 18% of the maximum width 21 of the lobed portion 20. FIG. 3 also shows outer peak width 25 and inner peak width 27. Preferably, the ratio of the outer peak width 25 to the inner peak width 27 is about 2.8.

Figure 5:
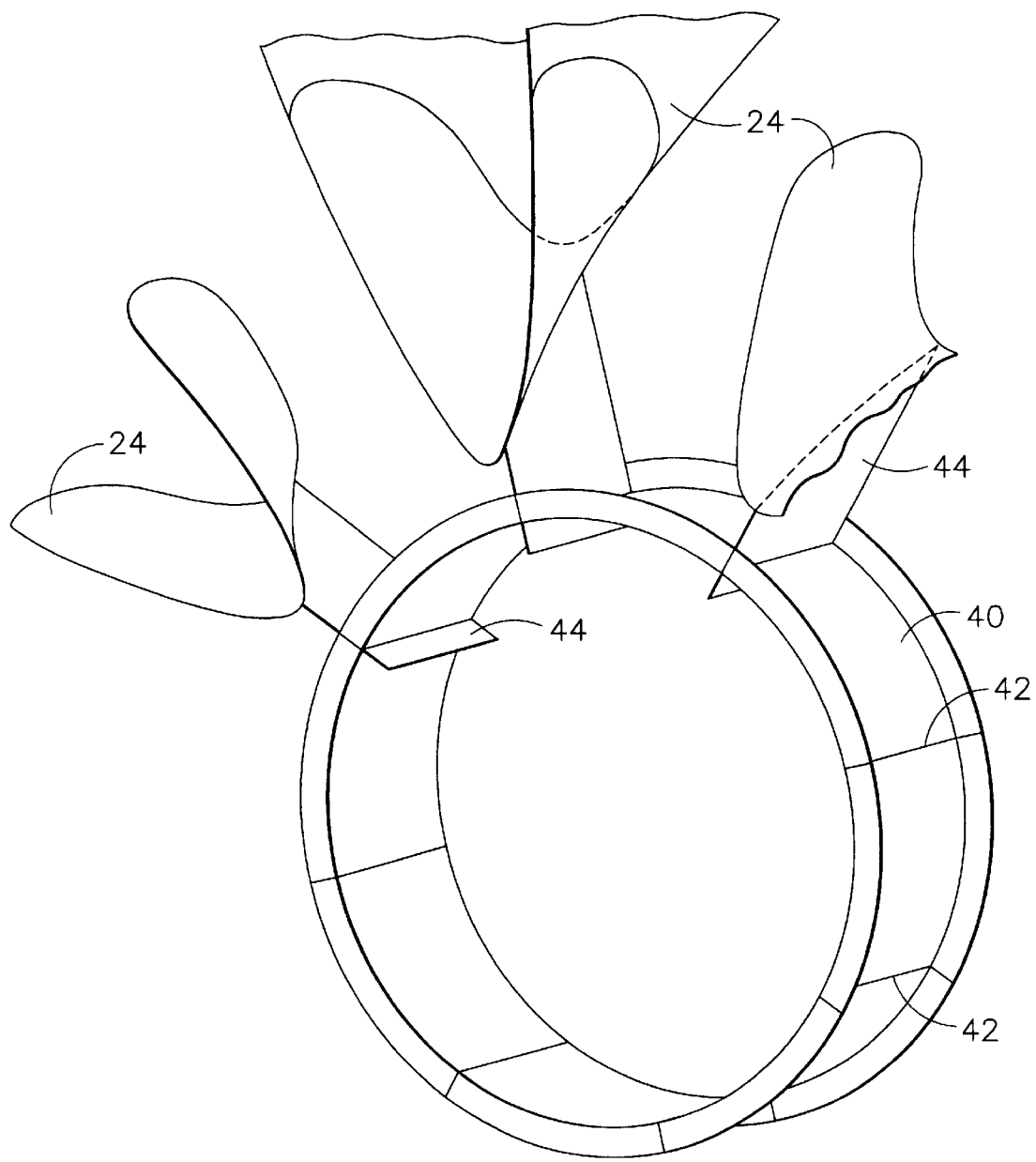
FIG. 5 shows the captive ring region of the tailpipe of FIG. 2.

Referring to FIGS. 2, 3 and 5, to enhance stiffness, the tailpipe 10 preferably includes outer braces 30 attached to and extending between each of the peaks 22. It also has an inner stiffening ring 40 with a plurality of slots 42. Attached to the radial inner surface of each of the valleys 24 is a leg portion 44 that is inserted into one of the slots 42 and welded thereto.

Thus the tailpipe 10 effectively eliminates the swirl of the exhaust, diffuses the exhaust gas flow and diminishes its exit velocity for the entire range of swirl angles.

Various modifications and alterations of the above described tailpipe assembly will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A deep lobed deswirling diffuser tailpipe in combination with a non-thrust producing gas turbine engine comprising a lobed portion substantially protruding said tailpipe flow having a plurality of circumferentially disposed peaks and valleys, the lobed portion extending a length X, wherein over at least the first 30 percent of length X, the radius of each valley is greater than the radius of each peak.

2. The deep lobed deswirling diffuser tailpipe of claim 1 wherein, over at least the first 30 percent of length X, a ratio of the valley radius to the peak radius is about 1.1.

3. The deep lobed deswirling diffuser tailpipe of claim 1 wherein, over at least the first 30 percent of length X, the radius of each valley is less than about 10% of an equivalent diameter $D_E$.

4. The deep lobed deswirling diffuser tailpipe of claim 1 wherein the peaks and valleys become sharper between 30 percent of X and 100 percent of X.

5. The deep lobed deswirling diffuser tailpipe of claim 1 wherein the effective flow area at 100 percent of X is greater than the effective flow area at 0.0 percent of X.

6. The deep lobed deswirling diffuser tailpipe of claim 5 wherein the effective flow area at 100 percent of X is at least about 1.72 times greater than the effective flow area at 0.0 percent of X.

7. The deep lobed deswirling diffuser tailpipe of claim 1 further comprising, upstream of the lobed portion, a cylindrical portion comprising a straight portion and a canted portion.

8. The deep lobed deswirling diffuser tailpipe of claim 1 further comprising a brace attached to and extending between each pair of adjacent peaks.

9. The deep lobed deswirling diffuser tailpipe of claim 1 further comprising an inner stiffening ring having a plurality of slots for receiving a leg portion extending from the radial inner surface of each of the valleys.

10. The deep lobed deswirling diffuser tailpipe of claim 1, further characterized in that the maximum lobe depth is about 40 percent of the maximum width of the lobed portion.

11. The deep lobed deswirling diffuser tailpipe of claim 10 wherein over the first 30 percent of length X, a ratio of the valley radius to the peak radius is about 1.1.

12. The deep lobed deswirling diffuser tailpipe of claim 10 wherein, over at least the first 30 percent of length X, the radius of each valley is less than about 10 percent of an equivalent diameter $D_E$.

13. The deep lobed deswirling diffuser tailpipe of claim 10 wherein the peaks and valleys become sharper between 30 percent of X and 100 percent of X.

14. The deep lobed deswirling diffuser tailpipe of claim 10 wherein the effective flow area at 100 percent of X is greater than the effective flow area at 0.0 percent of X.

15. The deep lobed deswirling diffuser tailpipe of claim 14 wherein the effective flow area at 100 percent of X is at least about 1.72 times greater than the effective flow area at 0.0 percent of X.

16. The deep lobed deswirling diffuser tailpipe of claim 10 further comprising a cylindrical portion upstream of the lobed portion.

17. The deep lobed deswirling diffuser tailpipe of claim 16 wherein the cylindrical portion includes a straight portion and a canted portion.

18. The deep lobed deswirling diffuser tailpipe of claim 17, wherein an angle between the straight portion and the canted portion is about 12 degrees.

19. The deep lobed deswirling diffuser tailpipe of claim 10 further comprising a brace attached to and extending between each pair of adjacent peaks.

20. The deep lobed deswirling diffuser tailpipe of claim 10 further comprising an inner stiffening ring having a plurality of slots for receiving a leg portion extending from the radial inner surface of each of the valleys.

21. A deep lobed deswirling diffuser tailpipe in combination with a non-thrust producing gas turbine engine comprising a cylindrical portion and a lobed portion substantially protruding said tailpipe flow having alternating peaks and valleys, the lobed portion having a maximum lobe depth equal to about 40 percent of a maximum width of the lobed portion.

22. The deep lobed deswirling diffuser tailpipe of claim 21 wherein an outer width of the peaks is greater than an inner width of the peaks by a factor of about 2.8.

23. The deep lobed deswirling diffuser tailpipe of claim 21 wherein a number of the peaks is eight and a number of the valleys is eight.

24. The deep lobed deswirling diffuser tailpipe of claim 21 further comprising braces attached to and extending between adjacent peaks.

25. The deep lobed deswirling diffuser tailpipe of claim 24 wherein the braces are attached to the peaks at substantially their widest portion.

26. The deep lobed deswirling diffuser tailpipe of claim 21 wherein a maximum width of the lobed portion exceeds a diameter of the cylindrical portion by a factor of at least about 1.7.

27. The deep lobed deswirling diffuser tailpipe of claim 21 further including an inner stiffening ring, the inner stiffening ring attached to the valleys, the inner stiffening ring having a diameter equal to about 18% of the maximum width of the lobed portion.

28. A deep lobed deswirling diffuser tailpipe in combination with a non-thrust producing gas turbine engine, the deep lobed deswirling diffuser substantially protruding said tailpipe flow and comprising:

a cylindrical portion for receiving a flow of hot gas from a gas turbine engine, the cylindrical portion having a straight portion and a canted portion, the straight portion having a collar for mounting to the gas turbine engine, the canted portion having a cant angle of about 12 degrees;

a lobed portion attached to the canted portion, the lobed portion having a plurality of circumferentially disposed peaks and valleys, the lobed portion extending a length X, wherein over at least the first 30 percent of length X, the radius of the each valley is greater than the radius of each peak by a factor of about 1.1, and the radius of each valley is greater than about 10 percent of the equivalent diameter of the lobed portion, the depth of the lobed portion at X=100 percent being about 40 percent of a maximum width of the lobed portion, the depth of the lobed portion increasing monotonically from X=0 to X=100 percent, a maximum width of the lobed portion exceeding a diameter of the cylindrical portion by a factor of at least about 1.5, a flow area of the tailpipe at X=100 percent being greater than a flow area of the tailpipe at X=0 by a factor of at least about 1.72, an outer width of the peaks being greater than an inner width of the peaks by a factor of about 2.8;

outer braces attached to and extending between adjacent ones of the peaks, the outer braces attached to the peaks at substantially their widest portion; and an inner stiffening ring attached by legs to the valleys, the inner stiffening ring having a diameter equal to about 18 percent of a width of the lobed portion.

\* \* \* \* \*

UNITED STATES PATENT AND TRADEMARK OFFICE
CERTIFICATE OF CORRECTION

PATENT NO.    : 6,412,283 B1
DATED         : July 2, 2002
INVENTOR(S)   : Yogendra Sheoran et al.

It is certified that error appears in the above-identified patent and that said Letters Patent is hereby corrected as shown below:

<u>Title page,</u>
Item [75], Inventor, replace "Knauer E. Chad" with -- Chad E. Knauer --

Signed and Sealed this

Eighteenth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,412,283 B1
DATED         : July 2, 2002
INVENTOR(S)   : Yogendra Sheoran et al.

It is certified that error appears in the above-identified patent and that said Letters Patent is hereby corrected as shown below:

<u>Column 1,</u>
Lines 11 and 12, replace "Contract No. DAA1110-99-C-021" with
-- Contract No. DAAH10-98-C-0027 --

Signed and Sealed this

Second Day of December, 2003

JAMES E. ROGAN
*Director of the United States Patent and Trademark Office*